US012794804B2

(12) United States Patent
Narasimhan et al.

(10) Patent No.: US 12,794,804 B2
(45) Date of Patent: Nov. 10, 2026

(54) SERVICE FUNCTION PROXY FOR SERVICE CHAINING IN SRv6 NETWORKS

(71) Applicant: Ciena Corporation, Hanover, MD (US)

(72) Inventors: Ashwath Narasimhan, San Jose, CA (US); Muthurajah Sivabalan, Kanata (CA); Lakshmi Rajasekaran, San Jose, CA (US); Jahanzeb Baqai, Livermore, CA (US)

(73) Assignee: Ciena Corporation, Fulton, MD (US)

( * ) Notice: Subject to any disclaimer, the term of this patent is extended or adjusted under 35 U.S.C. 154(b) by 151 days.

(21) Appl. No.: 18/892,887

(22) Filed: Sep. 23, 2024

(65) Prior Publication Data

US 2026/0089096 A1 Mar. 26, 2026

(51) Int. Cl.
*H04L 45/42* (2022.01)
*H04L 45/00* (2022.01)
*H04L 45/586* (2022.01)

(52) U.S. Cl.
CPC ............ *H04L 45/42* (2013.01); *H04L 45/566* (2013.01); *H04L 45/586* (2013.01)

(58) Field of Classification Search
None
See application file for complete search history.

(56) References Cited

U.S. PATENT DOCUMENTS 7,031,262 B2 4/2006 Vasseur et al.
7,599,349 B2 10/2009 Vasseur et al.
7,626,925 B1 12/2009 Sivabalan et al.
7,684,351 B2 3/2010 Vasseur et al.
7,801,048 B1 9/2010 Sivabalan et al.
8,004,964 B2 8/2011 Boutros et al.
8,131,873 B2 3/2012 Vasseur et al.
8,320,255 B2 11/2012 Vasseur et al.
8,391,163 B2 3/2013 Boutros et al.
8,572,225 B2 10/2013 Scudder et al.
8,908,527 B2 12/2014 Boutros et al.
8,976,682 B2 3/2015 Boutros et al.
9,313,145 B2 4/2016 Gandhi et al.

(Continued)

FOREIGN PATENT DOCUMENTS

CN 113691448 B 9/2022
WO 2022055861 A1 3/2022

OTHER PUBLICATIONS

Nov. 15, 2025, International Search Report and Written Opinion for International Patent Application No. PCT/US2025/046682.

(Continued)

*Primary Examiner* — Lashonda Jacobs-Burton
(74) *Attorney, Agent, or Firm* — Baratta Law PLLC; Lawrence A. Baratta, Jr.

(57) ABSTRACT

A node in a Segment Routing Internet Protocol version 6 (SRv6) network with the node configured as a Service Function (SF) Proxy in the SRv6 network, the node includes circuitry configured to, subsequent to installation of a Segment Identifier (SID) for a Service Function Chain (SFC), receive a packet with the SID included therein, remove all Segment Routing (SR) information from the packet, send the packet on an interface associated with an SR-unaware SF, and receive the packet on the interface after processing by the SR-unaware SF, wherein the packet from the interface is associated as returning traffic from the SF.

20 Claims, 6 Drawing Sheets

(56) References Cited

U.S. PATENT DOCUMENTS

| | | | | |
|---|---|---|---|---|
| 9,450,858 | B2 | 9/2016 | Saad et al. | |
| 9,497,107 | B1 | 11/2016 | Akiya et al. | |
| 9,647,929 | B2 | 5/2017 | Alvarez et al. | |
| 9,699,087 | B2 | 7/2017 | Boutros et al. | |
| 9,722,916 | B2 | 8/2017 | Sivabalan et al. | |
| 9,979,629 | B2 | 5/2018 | Sivabalan et al. | |
| 10,063,463 | B2 | 8/2018 | Saad et al. | |
| 10,158,558 | B1 | 12/2018 | Ward et al. | |
| 10,182,000 | B2 | 1/2019 | Saad et al. | |
| 10,250,459 | B2 | 4/2019 | Ali et al. | |
| 10,567,295 | B2 | 2/2020 | Barton et al. | |
| 11,102,109 | B1 | 8/2021 | Narasimhan et al. | |
| 11,496,354 | B2 | 11/2022 | Boutros et al. | |
| 11,516,112 | B2 * | 11/2022 | Boutros | H04L 12/4633 |
| 11,552,879 | B1 | 1/2023 | Sivabalan et al. | |
| 11,824,771 | B2 * | 11/2023 | Li | H04L 45/02 |
| 11,831,548 | B1 * | 11/2023 | Narasimhan | H04L 45/34 |
| 11,838,396 | B2 * | 12/2023 | Brissette | H04L 12/4633 |
| 2011/0280121 | A1 | 11/2011 | Boutros et al. | |
| 2014/0112124 | A1 | 4/2014 | Sivabalan et al. | |
| 2015/0256456 | A1 * | 9/2015 | Previdi | H04L 69/166<br>370/392 |
| 2015/0304185 | A1 | 10/2015 | Frost et al. | |
| 2017/0026461 | A1 | 1/2017 | Boutros et al. | |
| 2017/0048138 | A1 | 2/2017 | Sivabalan et al. | |
| 2017/0064717 | A1 | 3/2017 | Filsfils et al. | |
| 2017/0230274 | A1 | 8/2017 | Filsfils et al. | |
| 2018/0109450 | A1 | 4/2018 | Filsfils et al. | |
| 2019/0297017 | A1 | 9/2019 | Pignataro et al. | |
| 2020/0099610 | A1 * | 3/2020 | Heron | H04L 45/04 |
| 2020/0153856 | A1 | 5/2020 | Nainar et al. | |
| 2020/0204479 | A1 | 6/2020 | Filsfils et al. | |
| 2021/0092043 | A1 | 3/2021 | Filsfils et al. | |
| 2022/0131721 | A1 | 4/2022 | Boutros et al. | |
| 2022/0182326 | A1 * | 6/2022 | Gamage | H04L 45/26 |
| 2022/0200903 | A1 | 6/2022 | Boutros et al. | |
| 2022/0286395 | A1 | 9/2022 | Gandhi et al. | |
| 2023/0078123 | A1 * | 3/2023 | Zhang | H04L 45/566<br>709/238 |
| 2023/0164059 | A1 * | 5/2023 | Dawani | H04L 45/02<br>370/392 |
| 2024/0098161 | A1 * | 3/2024 | Brissette | H04L 12/4633 |
| 2025/0379817 | A1 * | 12/2025 | Hu | H04L 45/28 |

OTHER PUBLICATIONS

ETSI, "IPv6 Enhanced Innovation (IPE); IPv6 based enterprise networking and Industrial Internet," ETSI ISG IPE 004 V0.0.9, Dec. 6, 2021, pp. 1-60.

Dec. 21, 2023, International Search Report and Written Opinion for International Patent Application No. PCT/US2023/035115.

* cited by examiner

SERVICE FUNCTION PROXY FOR SERVICE CHAINING IN SRv6 NETWORKS

FIELD OF THE DISCLOSURE

The present disclosure relates generally to networking and computing. More particularly, the present disclosure relates to systems and methods for a Service Function (SF) proxy for service chaining in Segment Routing over Internet Protocol version 6 (SRv6) networks.

BACKGROUND OF THE DISCLOSURE

Service Function Chaining (SFC) using SRv6 helps create a service chain of connected network services. One advantage of using SFC is to automate the way the network can be set up to handle different traffic flows. A Classifier forwards the traffic to a specific Service Function Path (SFP) based on a certain set of configured rules. A Service Function Forwarder (SFF) forwards the traffic received to one or more Service Functions (SF) using the information in the SFC encapsulation. Service Functions (SFs) are responsible for specific treatment of the received traffic. A SF can be either SFC-aware or SFC-unaware. An SFC proxy is required for adding and removing SFC encapsulation when delivering packets to SFC-unaware Service Functions. The SFC proxy is described, e.g., in F. Clad et al., draft-ietf-spring-sr-service-programming-09, "Service Programming with Segment Routing," Feb. 20, 2024, the contents of which are incorporated by reference in their entirety. This draft describes four ways to achieve the SFC proxy, namely a static proxy, dynamic proxy, shared memory proxy, and masquerading proxy, each of which has inherent limitations. For instance, a static proxy requires information to be cached. A dynamic proxy requires hardware support for the operations and are likely to drop new packets generated by service functions. A shared memory proxy needs a virtual router (Vrouter) running in the same host to share memory space with third party service functions. A masquerading proxy keeps the Segment Routing Header (SRH) and assumes that SFs do not inspect the SRH, however in reality the third-party vendors that are SRv6 unaware, tend to drop such packets as these packets get flagged as a Denial-of-Service (DOS) attack. Also, one of the major drawbacks of all these proxy approaches is that they cannot function as the last segment in an SR service policy.

BRIEF SUMMARY OF THE DISCLOSURE

The present disclosure relates to systems and methods for a Service Function (SF) proxy for service chaining in Segment Routing over Internet Protocol version 6 (SRv6) networks. In particular, the present disclosure includes a unique way to embed the Locator and Function for service chaining using micro-Segment Identifiers (SIDs) (uSIDs), but the approach described herein can also be used with classical SIDs. A special 'Flow Identity' uSID is installed by all the SRv6 aware routers. A unique 'Flow Identity' SID can be distributed by Border Gateway Protocol (BGP) or any other Layer-3 protocol to identify either a Virtual Routing and Forwarding (VRF) endpoint or an Ethernet Virtual Private Network (EVPN) Instance (EVI). The 'Flow Identity' SID is installed by all the SF proxies that are participating in the chaining function. When a proxy node receives a packet with the Flow Identity SID, it will remove all SR information including the SRH and send it on the interface associated with the SF. The same destination VRF end point instance is created in the proxy routers in order to associate the returning traffic from the SF with the next SF destination using an SR-Policy thereby continuing the chain until the packet reaches the intended destination.

In an embodiment, a node is in a Segment Routing Internet Protocol version 6 (SRv6) network with the node configured as a Service Function (SF) Proxy in the SRv6 network. The node includes circuitry configured to, subsequent to installation of a Segment Identifier (SID) for a Service Function Chain (SFC), receive a packet with the SID included therein, remove all Segment Routing (SR) information from the packet, send the packet on an interface associated with an SR-unaware SF, and receive the packet on the interface after processing by the SR-unaware SF, wherein the packet from the interface is associated as returning traffic from the SF. The circuitry can be further configured to, subsequent to the packet being received on the interface, forward the packet to a next destination using a SR-Policy thereby continuing the SFC until the packet reaches an intended destination. The SID can be a unique Flow Identity micro-SID (uSID). The circuitry can be further configured to, prior to the installation of the SID, receive the SID via a Layer 3 protocol.

The SID can identify one of a Virtual Routing and Forwarding (VRF) endpoint, an Ethernet Virtual Private Network (EVPN) Instance (EVI), or a Layer 2 Virtual Private Network (VPN) (L2-VPN) end point, for the interface. The SR information includes a Segment Routing Header (SRH). The SID can be allocated with a unique endpoint behavior different from any endpoint behavior defined in standards. The SID can be allocated with a new SRv6 block for SFC proxy using a combination of algorithm and prefix block. The SID can be allocated with a combination of a pre-assigned Block Identifier and Reserved End point behaviors. The circuitry can be further configured to receive a SRv6 Capabilities Sub-TLV (Type-Length-Value) which includes information describing support for the SID in the SRv6 network.

In another embodiment, a method is implemented by a node that is a Service Function (SF) Proxy in a Segment Routing Internet Protocol version 6 (SRv6) network. The method includes steps of, subsequent to installing a Segment Identifier (SID) for a Service Function Chain (SFC), receiving a packet with the SID included therein; removing all Segment Routing (SR) information from the packet; sending the packet on an interface associated with an SR-unaware SF; and receiving the packet on the interface after processing by the SR-unaware SF, wherein the packet from the interface is associated as returning traffic from the SF. The steps can further include, subsequent to the packet being received on the interface, forwarding the packet to a next destination using a SR-Policy thereby continuing the SFC until the packet reaches an intended destination. The SID can be a unique Flow Identity micro-SID (uSID). The steps can further include, prior to the installation of the SID, receiving the SID via a Layer 3 protocol.

The SID can identify one of a Virtual Routing and Forwarding (VRF) endpoint, an Ethernet Virtual Private Network (EVPN) Instance (EVI), or a Layer 2 Virtual Private Network (VPN) (L2-VPN) end point, for the interface. The SR information can include a Segment Routing Header (SRH). The SID can be allocated with a unique endpoint behavior different from any endpoint behavior defined in standards. The SID can be allocated with a new SRv6 block for SFC proxy using a combination of algorithm and prefix block. The SID can be allocated with a combination of a pre-assigned Block Identifier and Reserved End point behaviors. The steps can further include receiving a SRv6 Capabilities Sub-TLV (Type-Length-Value) which includes information describing support for the SID in the SRv6 network.

BRIEF DESCRIPTION OF THE DRAWINGS

The present disclosure is detailed through various drawings, where like components or steps are indicated by identical reference numbers for clarity and consistency.

DETAILED DESCRIPTION OF THE DISCLOSURE

Again, the present disclosure relates to systems and methods for a Service Function (SF) proxy for service chaining in Segment Routing over Internet Protocol version 6 (SRv6) networks. The present disclosure includes (1) A unique 'Flow Identity' SID for supporting SFC. This removes the requirement to cache the SRH, a Per VRF or Per EVI Flow Identity SID removes the need for any new hardware processing support, the 'Flow Identity' SID allows the SF proxy to participate as the last segment as well, and there is no need to share process memory space with third party VNFs that might result in security implications.

(2) Unique approaches to allocate the 'Flow Identity' SID.

(3) A change in the Srv6 capabilities TLV to support the 'Flow Identity' SID.

In an example use case, the approach described herein can be used in SFC in mobility (5G) via SRv6 with the ability to support SFC based solutions without security implications, and with ability to support SFC based solutions without hardware enhancements.

Figure 1:
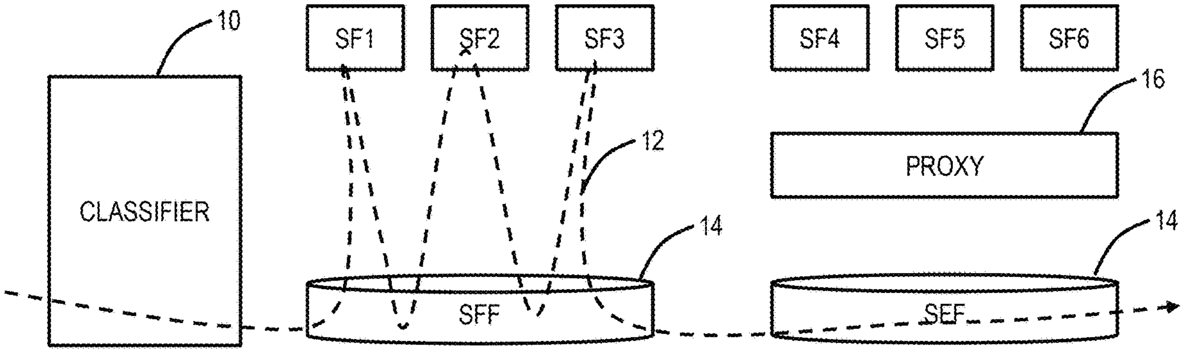
FIG. 1 is a diagram of an example of the basic architecture of Service Function Chaining (SFC).

Service Function Chaining (SFC) using SRv6 helps create a service chain of connected network services. One advantage of using SFC is to automate the way the network can be set up to handle different traffic flows. FIG. 1 is a diagram of an example of the basic architecture of Service Function Chaining (SFC). A Classifier 10 forwards the traffic to a specific Service Function Path (SFP) 12 based on certain set of configured rules. A Service Function Forwarder (SFF) 14 forwards the traffic received to one or more Service Functions (SF) (labeled as SF1-SF6) using the information in the SFC encapsulation. The Service Functions (SF) are responsible for specific treatment of the received traffic. SF can be either SFC-aware or SFC-unaware. An SFC proxy 16 is required for adding and removing SFC encapsulation when delivering packets to SFC-unaware Service Functions. For example, the SFF 14 can be a router or virtual router. The various SFs can be virtual network functions (VNFs), physical network elements, etc. As described herein, the term node can denote a router, a VNF, a physical network element, or any network element in an SRv6 network capable of transmitting and receiving packets with classical SIDs or uSIDs for purposes of SFC over SRv6.

Figure 2:
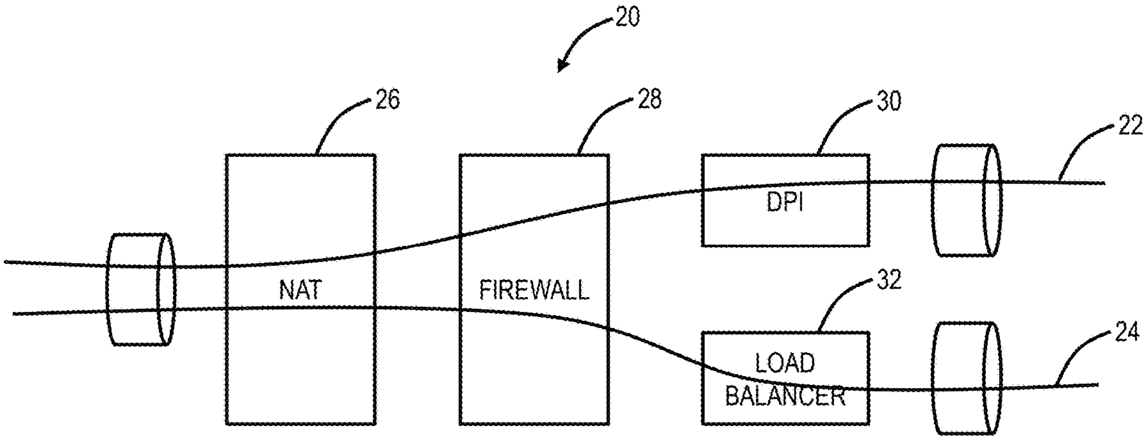
FIG. 2 is a diagram of a Service Function Chaining example.

FIG. 2 is a diagram of a Service Function Chaining example 20. FIG. 2 shows two flows 22. 24. One flow 22 passes through Network Address Translation (NAT) 26, Firewall 28, and Deep Packet Inspection (DPI) 30 while the other flow 24 passes through NAT 26, Firewall 28. and Load balancer 32. With the advent of Network Function Virtualization (NFV), traditional appliances can be replaced with software modules. These are called Service Functions (SFs). The SRv6 technology helps in steering the traffic through a pre-determined list of SFs. This is achieved by assigning a SRv6 segment identifier (SID) to each of the modules and sequencing them in a SID list.

Figure 3:
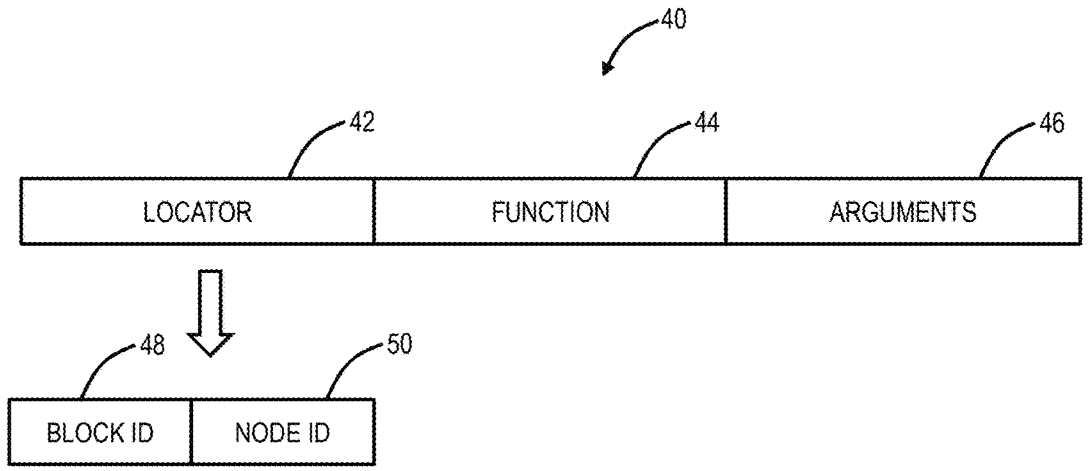
FIG. 3 is a diagram of a SRv6 SID Format.

A SRv6 SID 40 is represented by 128 bits address and it is split in three fields Locator 42, Function 44, Arguments 46, respectively, as illustrated in FIG. 3. The Locator 42 is represented by the most significant bits and is the routable portion of the SID 40. The Locator 42 is further split into locator block ID 48 and node ID 50. The function identifies the behaviour bound to that SID 40. Any additional information required by an SRv6 end point can be encoded in the Argument field. The functionality of the Locator 42, the Function 44, and the Arguments 46 is described, e.g., in Filsfils, et al., RFC 8986, Segment Routing over IPv6 (SRv6) Network Programming, February 2021, the contents of which are incorporated by reference. This document describes the use of a standard size SID for SFC, not uSID.

Locator 42

The Locator 42 can have a flexible length and an operator is free to use the locator length of their choice. The Locator 42 identifies the node which instantiates the SID. The Function 44 is an opaque identification of a local behavior bound to the SID. The term "function" refers to the bit-string in the SRv6 SID. The term "behavior" identifies the behavior bound to the SID. An SRv6 endpoint behavior may require additional information for its processing (e.g., related to the flow or service). This information may be encoded in the Arguments 46.

An uncompressed SRv6 SID is 128-bit long. The SRv6 architecture supports the ability to carry multiple smaller SIDs called micro SIDs (uSIDs) in a 128 uncompressed SID. Such ability leads to reduced Maximum Transmission Unit (MTU) overhead associated with uncompressed SIDs. A uSID is 16-bit long.

Figure 4:
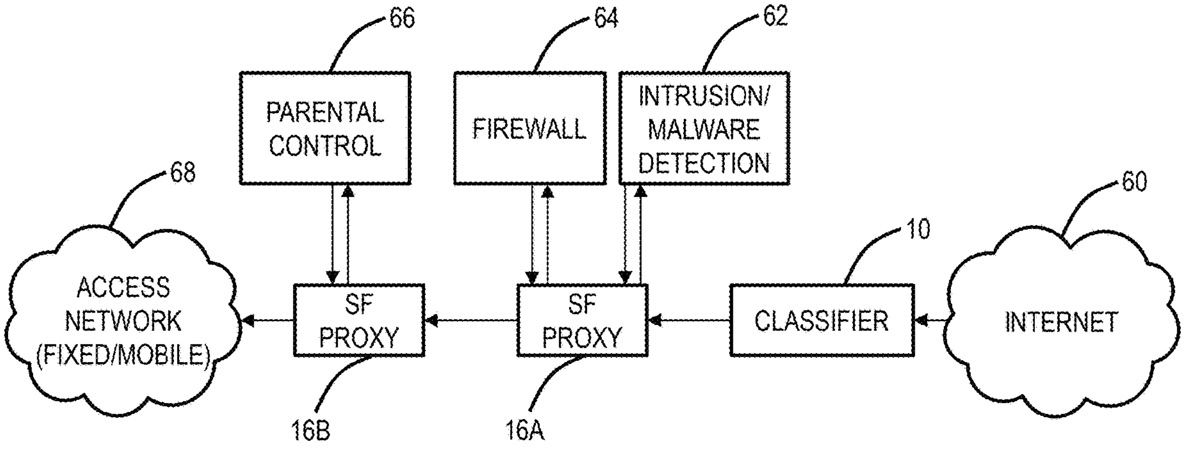
FIG. 4 is a diagram of an example of Service Function Chaining with SF proxies.

While the uSID instruction does a remarkable job in compressing the SIDs and reducing the MTU, the ability to associate an endpoint behavior (Function) to the SID is possible only if the Service Function (SF) is SRv6 aware. Most of the SFs like Firewall, Intrusion detection etc. support processing of Layer 4-to-Layer 7 traffic and need SFC proxy to support Layer 2, Layer 3 packet processing as shown in FIG. 4, which is an example of Service Function Chaining with SF proxies 16A, 16B. Here, traffic is received at the classifier 10, e.g., from the Internet 60, the classifier 10 forwards traffic to the SF proxies 16A, 16B, which provide the traffic to SFs 62, 64, 66, which are SRv6-unaware, i.e., an intrusion/malware detection SF 62, a firewall SF 64, and a parental control SF 66, and finally the SFC processed traffic is sent over an example network 68, e.g., an access network (fixed/mobile).

Again, draft-ietf-spring-sr-service-programming-09 proposes four ways to achieve the SF proxy 16, e.g., a static proxy, a dynamic proxy, a shared memory proxy, and a masquerading proxy, each of them has their own inherent limitations. For instance, the static proxy requires information to be cached. The dynamic proxy requires hardware support for the operations and are likely to drop new packets generated by service functions. The shared memory proxy needs a Vrouter running in the same host to share memory space with third party service functions. The masquerading proxy keeps the SRH and assumes that SF's do not inspect the SRH, however in reality the third-party vendors that are SRv6 unaware, tend to drop such packets as these packets get flagged as a DOS attack. One of the major drawbacks of all the above proxy approaches is that they cannot function as the last segment in an SR service policy.

Again, the present disclosure includes a unique way to embed Locator and Function for service chaining using USID. A special 'Flow Identity' uSID is installed by all the SRv6 aware routers. Note, while described herein as a 'Flow Identity' uSID, those skilled in the art will appreciate any type of uSID or SID that is used for similar functionality is contemplated herewith. A unique 'Flow Identity' SID is distributed by BGP and shall identifies either a VRF end point, an EVI instance, or a L2-VPN end point. The 'Flow Identity' SID is installed by all the SF proxies that are participating in the chaining function. When a proxy node receives a packet with a Flow Identity SID, it will remove all SR information including the SRH and send it on the interface associated with the SF. The same destination VRF instance is created in the proxy nodes (SF proxies) in order to associate the traffic received from the SF with the subsequent SF destination using an SR-Policy thereby continuing the chain until the packet reaches the intended destination.

Figure 5:
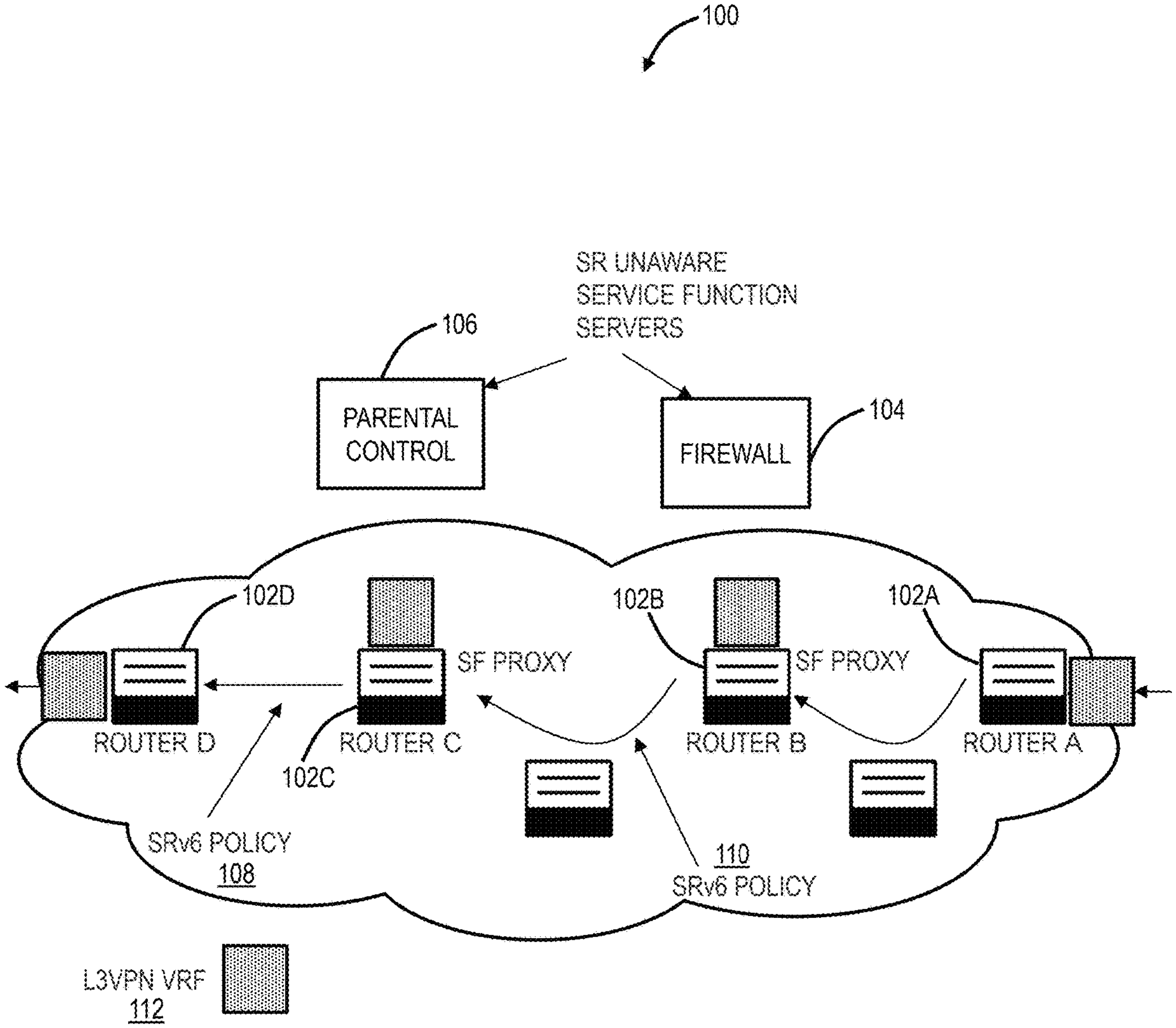
FIG. 5 is a network diagram of a network with routers illustrating a SFC proxy using Flow Identity.

FIG. 5 is a network diagram of a network 100 with routers 102 (labeled routers 102A-102D) illustrating a SFC proxy using Flow Identity. The routers 102A-102D are SRv6 aware. The router 102A is the source that receives the incoming traffic, and the router 120D is the destination. The routes 102C, 102D are SF proxies that are connected to a Firewall and Parental control Service functions 104, 106, respectively. SR-policies 108, 110 created on the routers 102A, 102B, 102C to provide layer 2 transport in each segment, i.e., A-to-B, B-to-C, C-to-D. The SR-policies 108, 110 have the unique 'Flow Identity' SID as the destination and the last hop in the SID list. In addition, a same VRF 112 as that of source and destination Provider Edge (PE) router is also created on the intermediary SF proxy routers 102C, 102D. All the routers 102A-102D participate in a BGP Layer 3 Virtual Private Network (L3VPN).

A unique 'Flow Identity' SID associated with a particular VRF 112 is advertised by the route 102D. All the SRv6 SF proxy aware routers 102B, 102C that can understand this unique SID install this unique SID as an endpoint cross connect while the destination router 102D shall install this as DT4/DT6/DT46. DT4/DT6/DT46 are described in Filsfils, et al., RFC 8986, Segment Routing over IPv6 (SRv6) Network Programming, February 2021, the contents of which are incorporated by reference in their entirety. DT4 is Endpoint with decapsulation and specific Internet Protocol version 4 (IPv4) table lookup, DT6 is Endpoint with decapsulation and specific Internet Protocol version 6 (IPv6) table lookup, and DT46 is Endpoint with decapsulation and specific IP table lookup behavior which is a variant of the End.DT4 and End.DT6 behavior.

The SRv6 proxy routers 102C, 102D map the 'Flow Identity' SID to an outgoing interface associated with an SF, e.g., the SFs 104, 106. In this example, the router 102B installs an entry that maps the unique 'Flow Identity' SID to the interface connecting the Firewall SF 104. Similarly, the router 102C installs an entry that maps the unique 'Flow Identity' SID to the interface connecting the Parental Control SF 106.

When a packet is received at the router 102A over the VRF, it shall choose an SR policy to go to the SF proxy router 102B with the destination and last hop being the unique 'Flow Identity' SID. When the router 102B receives this packet, it identifies the 'Flow Identity' SID and removes all SRH and sends it on the outgoing interface towards the Firewall SF 104. After the Firewall SF 104 is done processing, the packets return from the Firewall SF 104 and are received over the same VRF. At the router 102B, the VRF maps to an SR-policy that has SF proxy router 102C as the next hop and the unique 'Flow Identity' SID as the destination.

When the router 102C receives this packet, it identifies the 'Flow Identity' SID and removes all SRH and sends it on the outgoing interface towards the Parental Control SF 106. After the Parental Control SF 106 is done processing, the packets return from the Parental Control SF 106 and are received over the same VRF. At the router 102C, the VRF maps to an SR-policy that has router 102D as the next hop and the unique 'Flow Identity' SID as the destination.

When the router 102D receives this packet, it identifies the 'Flow Identity' SID and removes all SRH and processes it as a DT4/6/46 end point behavior.

Figure 6:
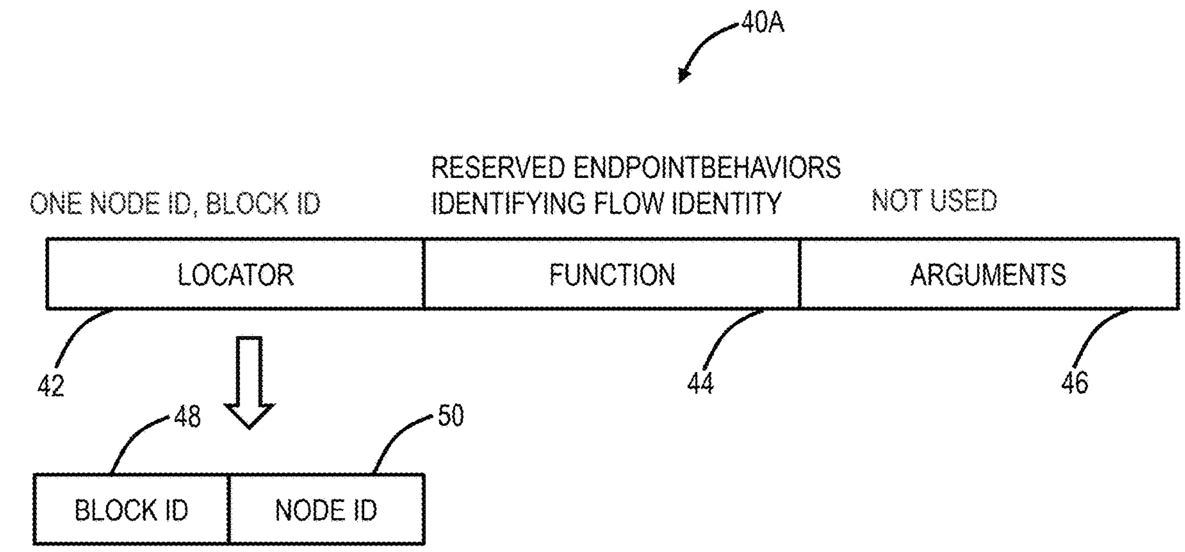
FIG. 6 is a diagram of an Approach A for the SRv6 SID Format with a unique Endpoint Behavior different from the ones defined in the RFC, Internet Assigned Numbers Authority (IANA) standards.

With the SRv6 SID 40, the present disclosure includes three example approaches of how the 'Flow Identity' SID can be allocated, referred to herein as approaches A, B, and C:

(A) A unique Endpoint Behavior different from the ones defined in the RFC, Internet Assigned Numbers Authority (IANA) standards, illustrated in FIG. 6.

Figure 7:
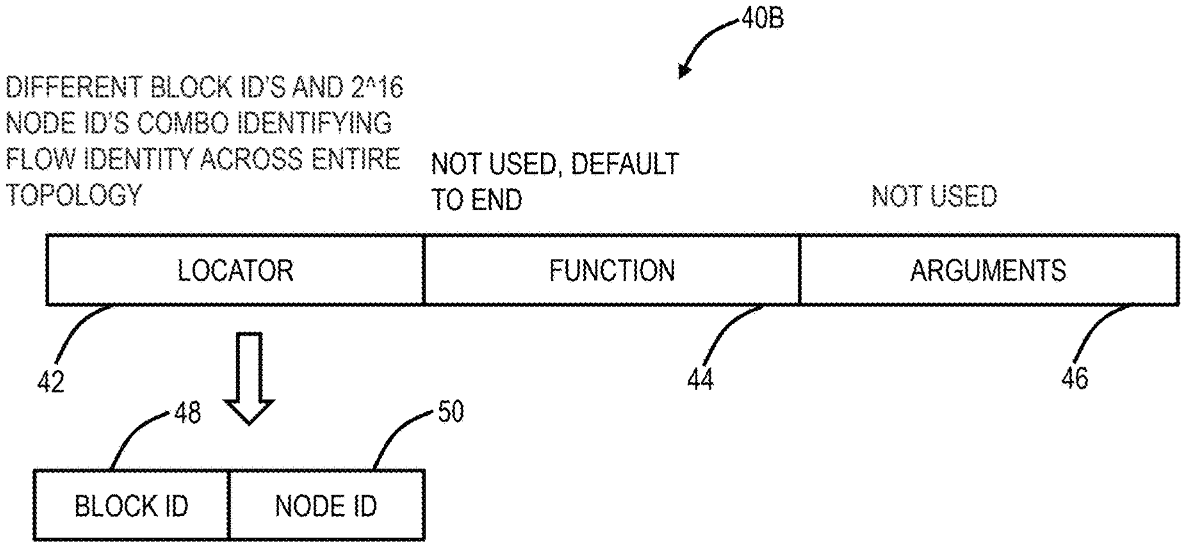
FIG. 7 is a diagram of an Approach B for the SRv6 SID Format with a unique locator preferably tied to a Flex Algo type that is different from the locators already residing in the system.

(B) A unique locator preferably tied to a Flex Algo type that is different from the locators already residing in the system, illustrated in FIG. 7.

Figure 8:
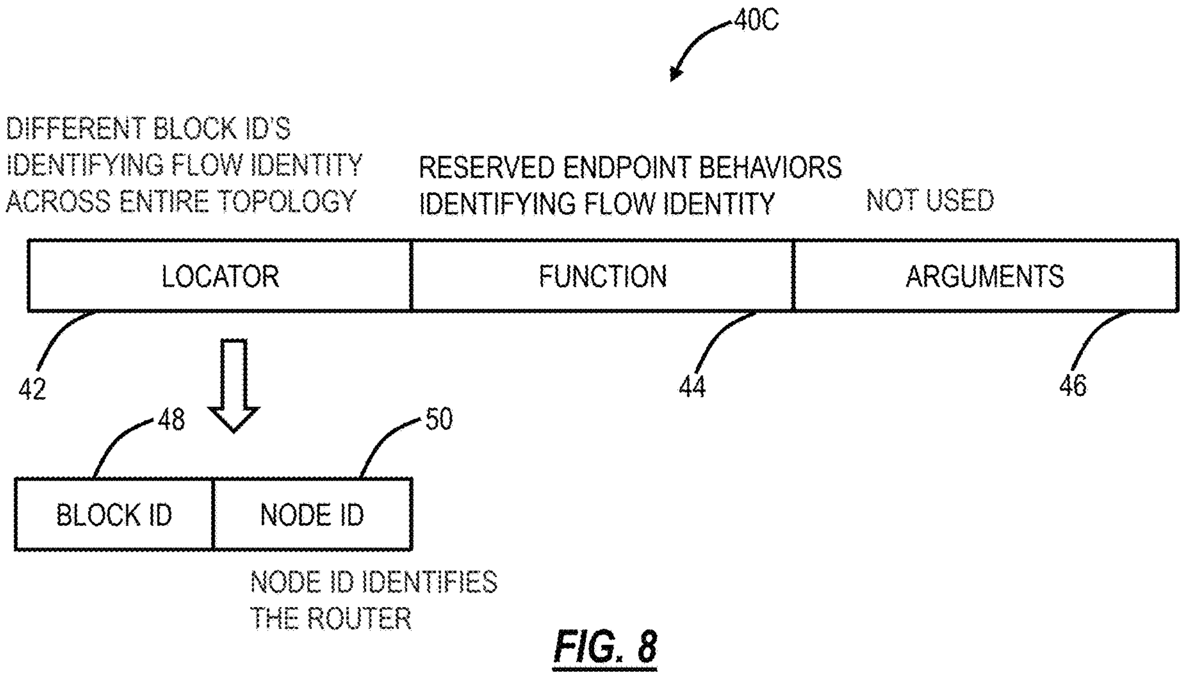
FIG. 8 is a diagram of an Approach C for the SRv6 SID Format which is a hybrid approach with unique locator per Flex Algo and endpoint behavior. (combination of approaches A and B).

(C) A hybrid approach with unique locator per Flex Algo and endpoint behavior. (combination of approaches A and B), illustrated in FIG. 8.

The Approach A does not scale beyond the limited number of 16-bit unassigned Endpoint behaviors (Reserved for private use) that can be configured. Here the Node identifier (ID) identifies the router, and the Block ID is the assigned prefix block for SRv6 usage. This does not require a centralized allocation scheme for each unidirectional VRF flow. However, this approach is restrictive in scale.

The Approach B works reasonably well as one could carve out an entirely new SRv6 block for SFC proxy purpose using the combination of Algorithm and Prefix Block. Using this approach one can support 2^16 unique unidirectional flows across the entire topology (no Node SID allocation) using a centralized allocation scheme for each unidirectional VRF Flow. This approach may not work in case of uSID since uSID shares the Prefix Block ID.

The Approach C is a hybrid approach that uses a mix of the Approach A and B. Here, a combination of pre-assigned Block ID and Reserved End point behaviors provides the necessary uniqueness to the SID participating in Flow Identity SID computation. The Node SID identifies the router. This does not require any centralized allocation scheme for each unidirectional VRF flow as the Node Id provides the required uniqueness. Note that we can associate any number of locators (Block IDs) per algorithm.

All three approaches perform reasonably well in lower scale (i.e. less than 2000 VRFs).

In order to support the approaches above, the present disclosure proposes any 2-bits from the reserved space of the 'SRv6 Capabilities Sub-TLV' (Type-Length-Value). The SRv6 Capabilities Sub-TLV is described in Psenak et al., RFC 9352, "IS-IS Extensions to Support Segment Routing over the IPV6 Data Plane," February 2023, the contents of which are incorporated by reference in their entirety. These 2-bits can be used to identify the following (1) Flow Identity locator support.

(2) Flow Identity SID allocation approach.

Figure 9:
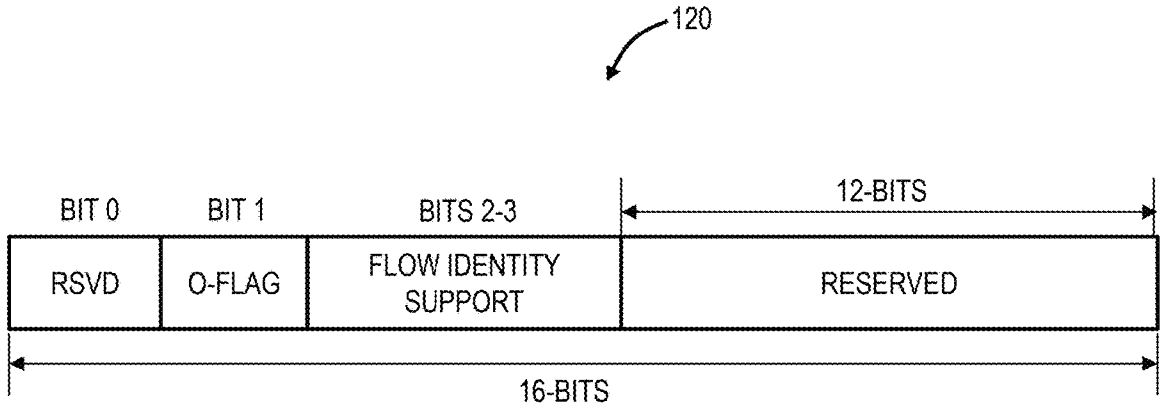
FIG. 9 is a diagram of a SRv6 Capabilities Sub-TLV with 2-bits used to identify Flow Identity support.

FIG. 9 is a diagram of a SRv6 Capabilities Sub-TLV with 2-bits used to identify Flow Identity support. In this example approach, bit 2 and bit 3 are used to indicate the presence of Flow Identity SID and the approach to allocate it. In an example, the table below shows the meaning of the binary states of bit 2 and bit 3.

| BIT 2 | BIT 3 | State |
|---|---|---|
| 0 | 0 | Flow Identity SID not supported |
| 0 | 1 | Supports Flow Identity SID with Approach A |
| 1 | 0 | Supports Flow Identity SID with Approach B |
| 1 | 1 | Supports Flow Identity SID with Approach C |

The present disclosure proposes that a mixed approach shall not be supported in the topology. In case the Srv6 advertised capabilities for Flow Identity approaches do not match between devices, all the devices shall default to "No Flow Identity Support" and shall refrain from advertising Flow Identity SIDs.

Figure 10:
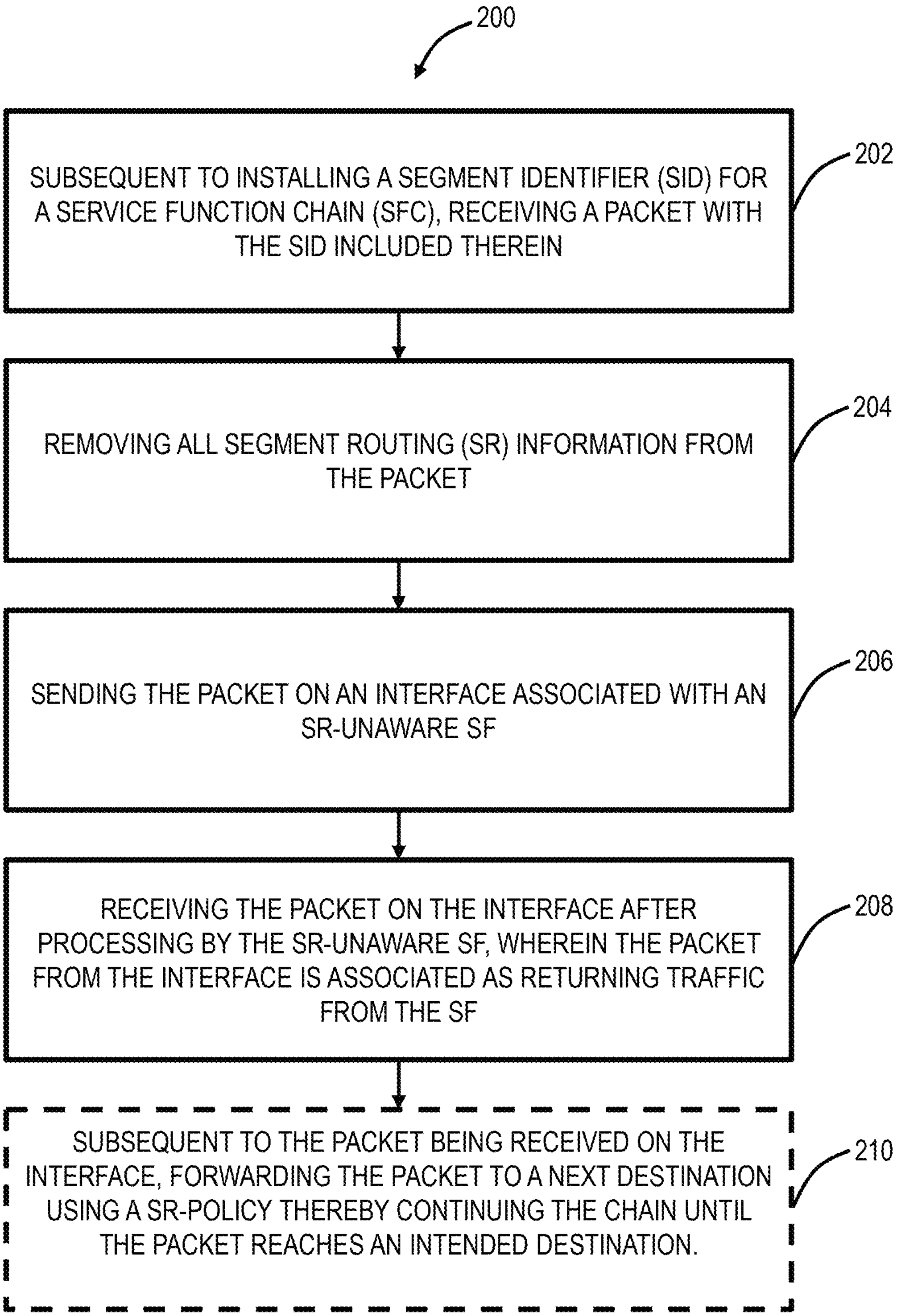
FIG. 10 is a flowchart of a process for Service Function (SF) proxy for service chaining in Segment Routing over Internet Protocol version 6 (SRv6) networks.

FIG. 10 is a flowchart of a process 200 for Service Function (SF) proxy for service chaining in Segment Routing over Internet Protocol version 6 (SRv6) networks. The process 200 contemplates implementation as a method having steps, via a node configured to implement the steps, such as an SF proxy in the SRv6 network, and as a non-transitory computer-readable medium storing instructions that, when executed, cause circuitry to implement the steps.

The process 200 includes, subsequent to installing a Segment Identifier (SID) for a Service Function Chain (SFC), receiving a packet with the SID included therein (step 202); removing all Segment Routing (SR) information from the packet (step 204); sending the packet on an interface associated with an SR-unaware SF (step 206); and receiving the packet on the interface after processing by the SR-unaware SF, wherein the packet from the interface is associated as returning traffic from the SF (step 208). The process 200 can include, subsequent to the packet being received on the interface, forwarding the packet to a next destination using a SR-Policy thereby continuing the chain until the packet reaches an intended destination (step 210).

The SID is a unique Flow Identity micro-SID (uSID). The process 200 can include, prior to the installation of the SID, receiving the SID via Border Gateway Protocol (BGP). The SID identifies one of a Virtual Routing and Forwarding (VRF) endpoint, an Ethernet Virtual Private Network (EVPN) Instance (EVI), or a Layer 2 Virtual Private Network (VPN) (L2-VPN) end point, for the interface. The SR information includes a Segment Routing Header (SRH).

In an embodiment, the SID is allocated with a unique endpoint behavior different from any endpoint behavior defined in standards. In another embodiment, the SID is allocated with a new SRv6 block for SFC proxy using a combination of algorithm and prefix block. In a further embodiment, the SID is allocated with a combination of a pre-assigned Block Identifier and Reserved End point behaviors. The process 200 can include receiving a SRv6 Capabilities Sub-TLV (Type-Length-Value) which includes information describing support for the SID in the SRv6 network.

Processing Circuitry and Non-Transitory Computer-Readable Mediums

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); Programmable Logic Device (PLD), or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each equipped with processing circuitry. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

Conclusion

As used herein, including in the claims, the phrases "at least one of" or "one or more of" a list of items refer to any combination of those items, including single members. For example, "at least one of: A, B, or C" covers the possibilities of: A only, B only, C only, a combination of A and B, a combination of A and C, a combination of B and C, and a combination of A, B, and C. Additionally, the terms "comprise," "comprises," "comprising," "include," "includes," and "including" are intended to be non-limiting and open-ended. These terms specify essential elements or steps but do not exclude additional elements or steps, even when a claim or series of claims includes more than one of these terms.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. That is, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

Although operations, steps, instructions, and the like are shown in the drawings in a particular order, this does not imply that they must be performed in that specific sequence or that all depicted operations are necessary to achieve desirable results. The drawings may schematically represent example processes as flowcharts or flow diagrams, but additional operations not depicted can be incorporated. For instance, extra operations can occur before, after, simultaneously with, or between any of the illustrated steps. In some cases, multitasking and parallel processing are contemplated. Furthermore, the separation of system components described should not be interpreted as mandatory for all implementations, as the program components and systems can be integrated into a single software product or distributed across multiple software products.

What is claimed is:

1. A node in a Segment Routing Internet Protocol version 6 (SRv6) network with the node configured as a Service Function (SF) Proxy in the SRv6network, the node comprising circuitry configured to:

subsequent to installation of a Segment Identifier (SID) for a Service Function Chain (SFC), receive a packet with the SID included therein, wherein the SID is installed at the node and at one or more additional SF Proxies participating in the SFC, and wherein a same destination Virtual Routing and Forwarding (VRF) endpoint instance is created at the node and at the one or more additional SF Proxies, remove all Segment Routing (SR) information from the packet, send the packet on an interface associated with an SR-unaware SF, and receive the packet on the interface after processing by the SR-unaware SF, wherein the packet from the interface is associated, by way of the same destination VRF endpoint instance, as returning traffic from the SF.

2. The node of claim 1, wherein the circuitry is further configured to subsequent to the packet being received on the interface, forward the packet to a next destination using a SR-Policy thereby continuing the SFC until the packet reaches an intended destination.

3. The node of claim 1, wherein the SID is a unique Flow Identity micro-SID (uSID).

4. The node of claim 1, wherein the circuitry is further configured to prior to the installation of the SID, receive the SID via a Layer 3 protocol.

5. The node of claim 1, wherein the same destination VRF endpoint instance corresponds to the SID, and wherein the SID identifies the VRF endpoint, an Ethernet Virtual Private Network (EVPN) Instance (EVI), or a Layer 2 Virtual Private Network (VPN) (L2-VPN) end point, for the interface.

6. The node of claim 1, wherein the SR information includes a Segment Routing Header (SRH).

7. The node of claim 1, wherein the SID is allocated with a unique endpoint behavior different from any endpoint behavior defined in standards.

8. The node of claim 1, wherein the SID is allocated with a new SRv6 block for SFC proxy using a combination of algorithm and prefix block.

9. The node of claim 1, wherein the SID is allocated with a combination of a pre-assigned Block Identifier and Reserved End point behaviors.

10. The node of claim 1, wherein the circuitry is further configured to receive a SRv6 Capabilities Sub-TLV (Type-Length-Value) which includes information describing support for the SID in the SRv6 network.

11. A method implemented by a node that is a Service Function (SF) Proxy in a Segment Routing Internet Protocol version 6 (SRv6) network, the method comprising steps of:

subsequent to installing a Segment Identifier (SID) for a Service Function Chain (SFC), receiving a packet with the SID included therein, the SID being installed at the node and at one or more additional SF Proxies participating in the SFC, and a same destination Virtual Routing and Forwarding (VRF) endpoint instance being created at the node and at the one or more additional SF Proxies;

removing all Segment Routing (SR) information from the packet;

sending the packet on an interface associated with an SR-unaware SF; and receiving the packet on the interface after processing by the SR-unaware SF, wherein the packet from the interface is associated, by way of the same destination VRF endpoint instance, as returning traffic from the SF.

12. The method of claim 11, wherein the steps further include subsequent to the packet being received on the interface, forwarding the packet to a next destination using a SR-Policy thereby continuing the SFC until the packet reaches an intended destination.

13. The method of claim 11, wherein the SID is a unique Flow Identity micro-SID (uSID).

14. The method of claim 11, wherein the steps further include prior to the installation of the SID, receiving the SID via a Layer 3 protocol.

15. The method of claim 11, wherein the same destination VRF endpoint instance corresponds to the SID, and wherein the SID identifies the VRF endpoint, an Ethernet Virtual Private Network (EVPN) Instance (EVI), or a Layer 2 Virtual Private Network (VPN) (L2-VPN) end point, for the interface.

16. The method of claim 11, wherein the SR information includes a Segment Routing Header (SRH).

17. The method of claim 11, wherein the SID is allocated with a unique endpoint behavior different from any endpoint behavior defined in standards.

18. The method of claim 11, wherein the SID is allocated with a new SRv6 block for SFC proxy using a combination of algorithm and prefix block.

19. The method of claim 11, wherein the SID is allocated with a combination of a pre-assigned Block Identifier and Reserved End point behaviors.

20. The method of claim 11, wherein the steps further include receiving a SRv6 Capabilities Sub-TLV (Type-Length-Value) which includes information describing support for the SID in the SRv6 network.

* * * * *